Oct. 17, 1967     S. H. RASKIN     3,347,326
RAILROAD TRACK WEIGHING CELL
Filed Nov. 17, 1965     3 Sheets-Sheet 2

INVENTOR
Seymour H. Raskin
BY
ATTORNEYS

Oct. 17, 1967  S. H. RASKIN  3,347,326
RAILROAD TRACK WEIGHING CELL
Filed Nov. 17, 1965  3 Sheets-Sheet 3
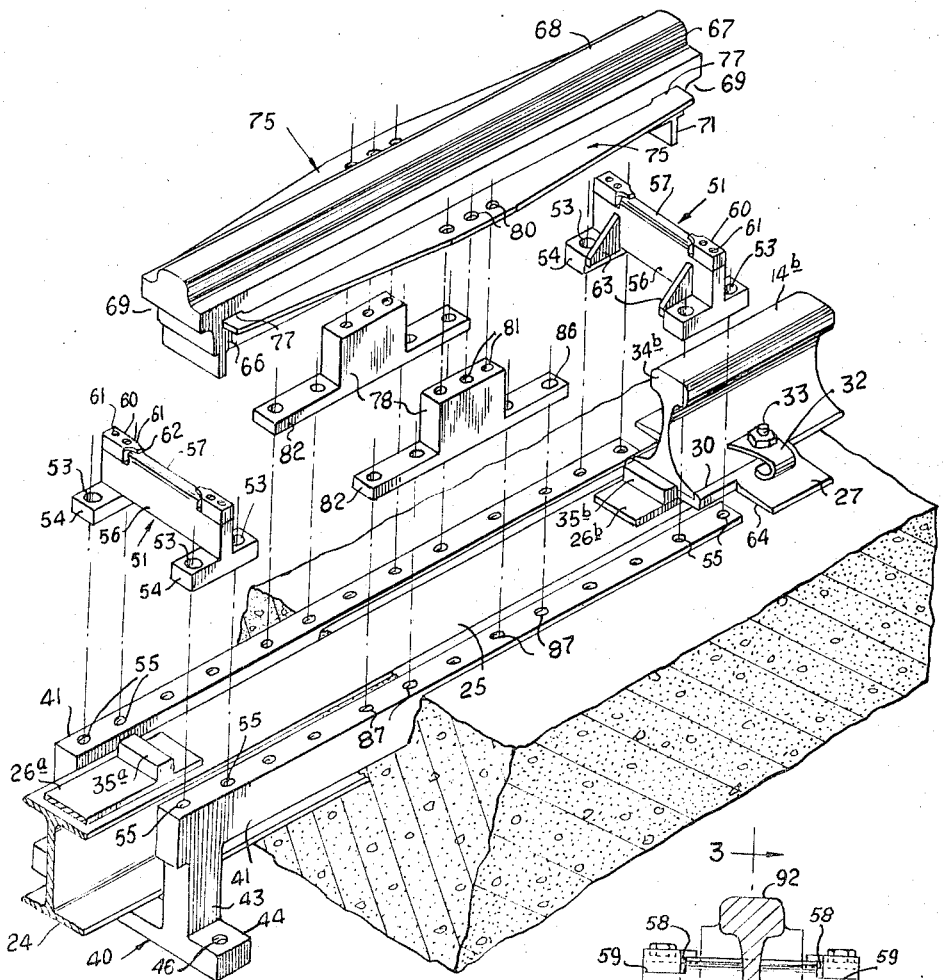
Fig. 6
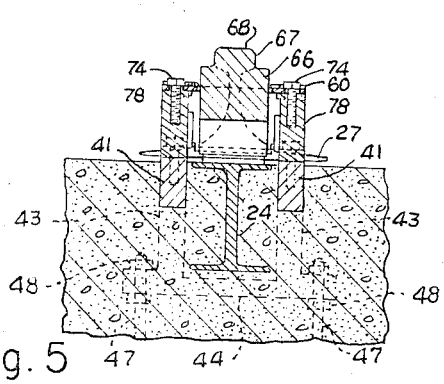
Fig. 5
Fig. 4
INVENTOR
Seymour H. Raskin
BY
ATTORNEYS

United States Patent Office 3,347,326
Patented Oct. 17, 1967

3,347,326
RAILROAD TRACK WEIGHING CELL
Seymour H. Raskin, 6707 Brookshire Drive,
Dallas, Tex. 75230
Filed Nov. 17, 1965, Ser. No. 508,301
14 Claims. (Cl. 177—163)

This invention relates to weighing apparatus and more particularly to a weighing apparatus for weighing moving loads.

An object of this invention is to provide a new and improved apparatus for weighing moving loads having a beam supported at longitudinally spaced locations and means for measuring the strain or deflection of the beam as the load moves over the beam between the spaced locations.

Another object is to provide an apparatus for weighing moving loads wherein the means supporting the beam at its spaced locations and the means holding the beam against movement relative to the supporting means introduce no or minimal extraneous forces into the beam which would affect the degree of vertical deflection of the beam due to a given load moving over the beam.

Still another object is to provide a weighing apparatus for weighing moving loads, such as railroad vehicles moving over a pair of parallel railroad track rails, wherein the apparatus includes a pair of parallel weigh rails disposed in gaps between sections of the pair of track rails and wherein each weigh rail is supported at longitudinally spaced locations whereby the weigh rail deflects downwardly as the pair of wheels on each axle of the rail vehicle move over the weigh rail.

A further object is to provide a weigh rail apparatus wherein the weigh rails are isolated from the track rail so that expansion and contraction of such track rails will not affect the amount of deflection of the weigh rails as the wheels move thereover and whereby any forces imposed on the track rails on opposite ends of the weigh rails are not transmitted to the weigh rail.

A still further object is to provide a weigh rail assembly which includes a pair of spaced support saddles wherein the weigh rail at its opposite ends is provided with downwardly facing support surfaces lying in the longitudinal horizontal neutral axis of the weigh rail to make the degree of deflection of the weigh rail vary substantially linearly in accordance with the load borne by the weigh rail.

Another object is to provide a weigh rail assembly whose weigh rail is held against longitudinal movement in the gap between adjacent sections of a track rail by means of which do not introduce extraneous forces into the weigh rail while at the same time permitting the weigh rail to deflect downwardly and, as it expands and contracts with temperature changes, to move relative to support means on which its opposite ends are supported.

Still another object is to provide a weigh rail assembly having retainer means for holding the weigh rail against longitudinal movement which include flexure plates extending longitudinally at opposite sides of the weigh rail and secured to the weigh rail, adjacent the ends thereof, the flexure plates being secured at their middle portion to a base whereby the portions of the weigh rail extending longitudinally in opposite directions from its rail part are free to move longitudinally as the rail and the flexive plates expand and contract and whereby no or very minimal forces are exerted by the flexure plates on the weigh rail as it is deflected downwardly by a load moving thereover.

Still another object is to provide a weighing apparatus wherein the sections of the track rail on opposite ends of the weigh rail are rigidly secured in alignment with the weigh rail to a base and are isolated from the weigh rail.

Additional objects and advantages of the invention will be readily apparent from the reading of the following description of a device constructed in accordance with the invention, and reference to the accompanying drawings thereof, wherein:

FIGURE 4 is a sectional view taken on line 4—4 of FIGURE 2;

FIGURE 5 is a sectional view taken on line 5—5 of FIGURE 2;

FIGURE 6 is a fragmentary perspective partly exploded view of a portion of the weighing apparatus;

FIGURE 7 is a fragmentary enlarged sectional view showing one form of the support means for the weigh rail; and, FIGURE 8 is a view similar to FIGURE 7 showing another form of the support means.

Figure 1:
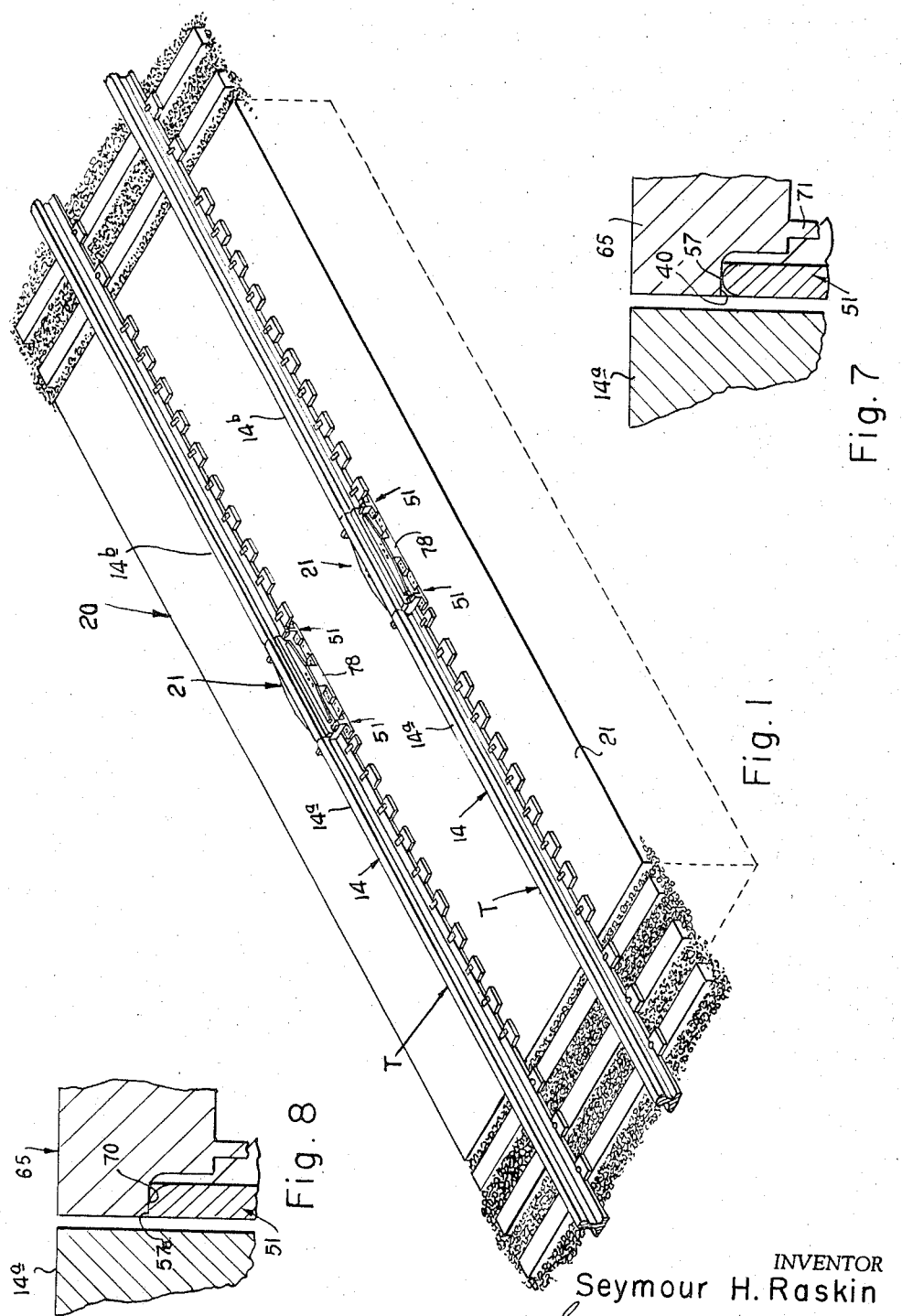
FIGURE 1 is a perspective view of the weighing apparatus embodying the invention.
Figure 2:
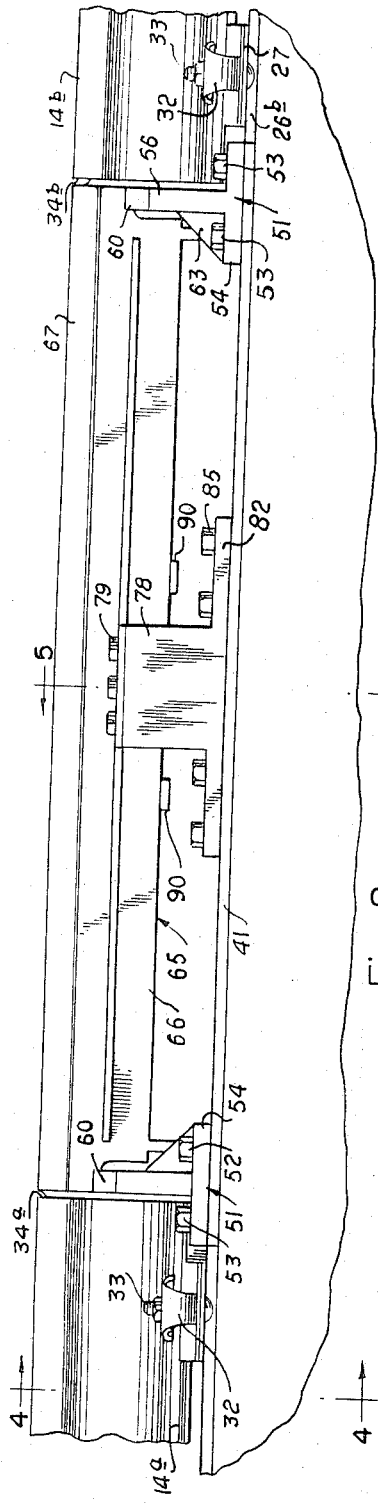
FIGURE 2 is a fragmentary side view of the apparatus illustrated in FIGURE 1.
Figure 3:
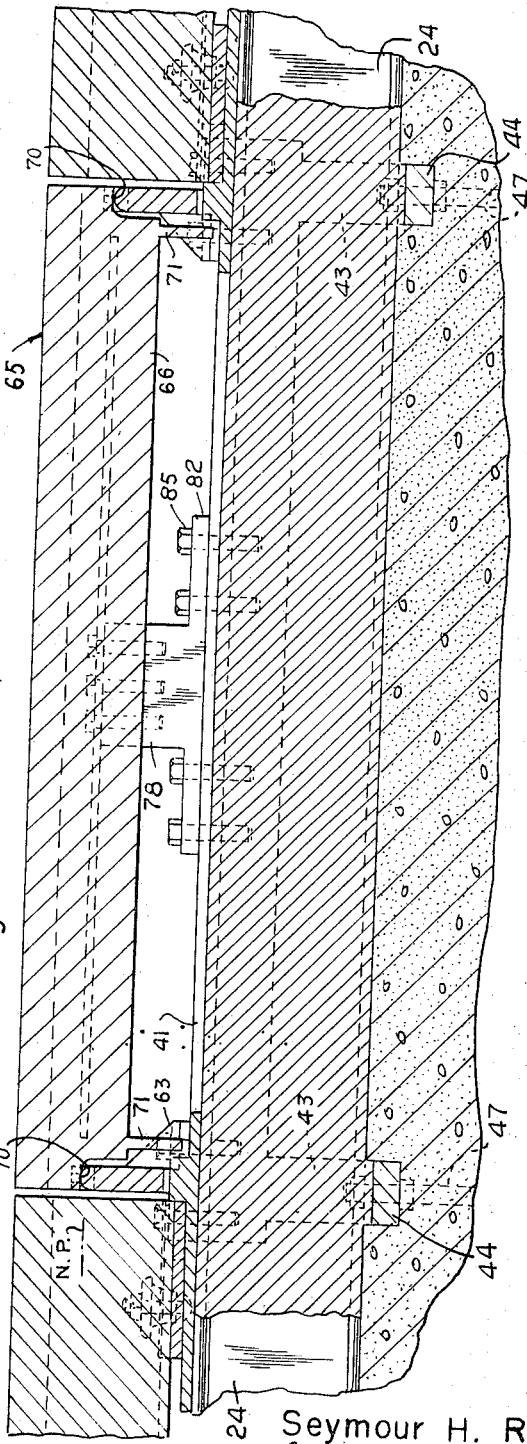
FIGURE 3 is a vertical longitudinal sectional view of the apparatus ilustrated in FIGURE 2 taken on line 3—3 of FIGURE 4.

Referring now to the drawings, the weighing device 20 includes a concrete base 21 on which a pair of identical weigh rail assemblies 21 are mounted in parallel relationship to constitute sections of the usual pair of parallel railroad tracks T formed of the track rails. The concrete base has a pair of track rail support beams 24, which may be of the usual I-beam type, embedded therein beneath the track rails 14 and which extend substantially the full length of the base, for example, if the base is twenty feet long, the support beams may be nineteen feet long and extend to within one-half foot of each end of the base.

The sections 14a and 14b of each track rail which extend in opposite directions from opposite ends of the weigh rail assembly disposed in the gap therebetween, are supported on the top horizontal surface 25 of the support beam 24 disposed therebelow by means of elongate shim plates 26a and 26b and the usual tie plates 27. The shim plates rest on the top surface of the support beam and the bottom surfaces of the tie plates rest on the shim plates. Lateral portions of the tie plates extend outwardly of the support beam over the concrete base and are rigidly secured thereto by means of studs 28 whose lower portions are embedded in the concrete base and whose upper portions extend through suitable apertures in the tie plates. Nuts 29 are threaded on the upper ends of the studs.

The tie plates have upwardly opening recesses 30 in which the bottom portion or flange 31 of the track rail is received. The rails are held against displacement from the recesses of the tie plates by the usual spring clamps 32 which are secured to the tie plates by bolts 33.

The ends 34a and 34b of the rail sections 14a and 14b of each track between which the weigh rail assembly is located, are held against movement toward each other by stop blocks 35a and 35b, respectively, rigidly secured to the shim plates 26a and 26b, as by welding. The shim plates are also rigidly secured to the support beam by welding. The rail sections 14a and 14b of each rail 14 are thus rigidly secured to the base.

Each of the weigh rail assemblies 21 is mounted on a support frame 40 embedded in the base and comprising a pair of parallel support bars 41 disposed on opposite sides of and spaced from the support beam over which it is located, dependent legs 43 adjacent the ends of the support bars, and foot plates 44 connecting the lower ends of the legs at each end of the support frame. The foot plates have vertical apertures 46 through which reinforcing rods 47 may extend. The reinforcing rods have nuts 48 threaded on their upper ends to secure the rods to the foot plates. The reinforcing rods are embedded in the concrete. Other reinforcing rods, not shown, extend both transversely and longitudinally through the concrete base.

A pair of weigh rail saddles 51 are rigidly secured to opposite ends of the support bars 41 of the support frame 40 by means of bolts 52 which extend through apertures 53 in the horizontal foot plates 54 of the saddles into upwardly opening threaded bores 55 of the support bars.

Each of the saddles has a transverse plate 56 integral with the longitudinally extending foot plates, whose upper end portion provides an arcuate transverse support surface 57. The transverse plate has upper end recesses 58 providing horizontal planar surfaces 59 on which rest keeper blocks 60. The keeper blocks are secured to the transverse plate by means of bolts 61 which extend through suitable apertures in the keeper blocks into the upwardly opening threaded bores of the transverse bar. The keeper blocks have upper inwardly extending tongue portions 62 which decrease in width inwardly so that only the small vertical inner surfaces 62 of the keeper block tongues are adapted to engage the opposite sides surfaces of the weigh rail to limit its lateral movement on the saddle. Gusset plates 63 are welded to the vertical transverse plates of the saddles and their foot plates.

Opposite ends of the tie plates 27 nearest the support base 40 have corner recesses 64 to permit the ends of the support bars to extend past the inner ends of the rail sections 14a and 14b.

The weigh rail 65 has a main body portion 66 rectangular in cross-sectional configuration and a raised central longitudinally extending track portion 67 which provides the tread or support surface 68 over which are movable the flanged wheels, not shown, of a railroad car. The weigh rail has downwardly and outwardly opening end recesses 69 which provided downwardly facing horizontal support surfaces 70 which lie in the same plane as the neutral axis NA of the weigh rail and which are engagable with the arcuate support surfaces 57 of the transverse plates of the saddles.

It is well known that a beam, such as the weigh rail 65, supported at its ends as by the transverse saddles 51, deflects downwardly as a load is imposed thereon between the locations of its support, and as it deflects downwardly, the fibers in its top portions are placed in compression, the fibers in its bottom portions are placed in tension, and the fibers lying in the place of its longitudinal neutral axis are neither in tension nor in compression. The cross-sectional center of gravity of the weigh rail preferably lies in the neutral axis. As is fully explained in United States Letters Patent No. 3,155,184, to S. H. Raskin, this relationship of the location of support of the weigh rail and its center of gravity relative to its neutral axis is desired in order that various extraneous forces exerted on the weigh rail by a wheel as it rolls therebelow, such as drag or longitudinal forces, be minimized or balanced out.

The weigh rail has dependent guide flanges 71 inwardly of its end recesses which extend downwardly between the gusset plates of the saddles and which, when the guide rail is properly positioned on the saddles, do not contact the gusset plates or any other part of the saddles. The keeper blocks, the guide flanges and the gusset plates are provided to prevent lateral displacement of the weigh rail as by accidental lateral forces imparted thereto. The flanges 71 also hold the bottom surface of the weigh rail spaced above any support surface on which the rail is positioned when not supported by the saddles.

The weigh rail is held against longitudinal and lateral movement on the saddles by a pair of flexure plates 75 which extend longitudinally along opposite sides of the weigh rail and are secured to the weigh rail adjacent its ends by means of their lateral inwardly extending end arms 77 which are welded to the weigh rail at the plane of neutral axis. The middle portions of the flexure plates are rigidly secured to retainer blocks 78 by bolts 79 which extend through suitable apertures 80 of the flexure plates into the threaded bores 81 of the retainer blocks. The retainer blocks have longitudinally outwardly extending foot portions 82 secured to the support bars on which they rest by means of bolts 85 which extend through the apertures 86 in the foot portions into threaded bores 87 of the support bars. The flexure plates prevent longitudinal and lateral movement of the weigh rail while at the same time allowing the weigh rail to expand and contract with changes of temperature since the opposite ends of the weigh rail are supported slidably on the saddles and the flexure plates are formed of the same metal as the weigh rail and have the same coefficient of thermal extension and contraction as the weigh rail. The flexure plates are thin compared to the weigh rail and being connected to the weigh rail at the plane of the neutral axis of the weigh rail and adjacent the ends thereof, do not interfere with the downward deflection of the weigh rail as a load moves thereover. Any resistance offered by the flexure plates to the downward deflection of the weigh rail are minimal since the flexure plates may flex between their middle and end portions. The provision of the flexure plates for holding the weigh rail against lateral and longitudinal movement while permitting the expansion and contraction of the rail prevents or minimizes extraneous forces being imparted to the weigh rail which would cause an inaccurate signal to be produced by a sensing means, such as the strain gauges 90 which are bonded to the bottom surface of the weigh rail on opposite sides of its mid point of span which provide an output signal which varies in accordance with the downward deflection of the weigh rail and therefor with the weight of the load. The deflection of the weigh rail is preferably sensed when the load is at the midpoint of the span of the weigh rail as is fully explained in the United States Letters Patent No. 3,155,184 to S. H. Raskin.

When the weigh rail assemblies are mounted on the base 21 their treads or support surfaces 68 are in longitudinal and vertical alignment with the treads or support surfaces 92 of the track rail sections 14a and 14b. As the wheels on the axle of a railroad car moving over the tracks T move onto the rail sections on one end of the weigh rail assembly, for example, the rail sections 14a, they are guided by the tracks 14a and will move onto the weigh rails without introducing any lateral forces to the weigh rails. As the wheels on one axle move over the weigh rails of the two weigh rail assemblies, the weigh rails deflect downwardly in accordance with the loads imposed thereon by the wheels and the signal produced by their deflection sensing means is then transmitted by suitable conductors, not shown, to a measuring device which translates the output signals of the sensing into an indication or recording of the weight supported by the weigh rails. Since the weigh rail assemblies are effectively isolated from the track rail sections on each end thereof, wheels rolling on the rail sections on opposite sides of the weigh rails, while the deflection of the weigh rails by wheels thereon is being sensed, do not introduce any extraneous forces into the weigh rails which would cause the output signal of the sensing means to be erroneous. The weigh rails are connected to the support bars 41 of their support frames 40 and the track rail sections are being connected to the support beams 24. Moreover, the end surfaces 34a and 34b of the track rail sections do not and cannot engage the end surfaces of the weigh rails due to the provision of a narrow gap or space therebetween and also due to the provision of the stop blocks 35a and 35b.

It will be seen that a new and improved weighing apparatus has been described which includes a base, a pair of weigh rail assemblies mounted on the base to support frames and disposed in parallel relation in gaps between sections of a pair of track rails, the track rail sections on opposite ends of the gaps being rigidly secured in longitudinal and vertical alignment with the weigh rails by means of a support beam embedded in the concrete base.

It will further be seen that the weigh rail assemblies are mounted on support bars which are not connected to the support beam so that the weigh rails do not engage any portions of the track rail sections adjacent their opposite ends whereby no forces present in the track rail sections are transmitted to the weigh rails.

It will further be seen that the weigh rails are secured to the base by means which permit it to expand and contract with changes of temperature, since its support surfaces 70 are slidably disposed on the support saddles, but which holds the weigh rails against lateral or longitudinal displacement relative to the adjacent track rail sections 75 of each weigh rail.

It will further be seen that the flexure plates being connected to the weigh rail at locations adjacent the ends of the weigh rail and at levels of the neutral axis of the beam, introduce no or minimal forces into the weigh rail during its deflection by a load moving thereof.

Referring now particularly to FIGURE 8 of the drawing, the transverse plates 51 of the support saddles, instead of being provided with the arcuate support surface 57 may be provided with a very narrow planar surface 57a at their outer edges or the support surfaces 70 of the weigh rails 65 may rest in order that the weigh rail be supported at its outermost ends in order that the external portions of the weigh rails be held against downward movement as when initially engages the weigh rail or moves off the weigh rail.

It will further be seen that the weigh rail may be regarded as a beam or weighing platform having relatively flexible flexure plates which extend substantially the length of the beam or weighing platform and are secured to the beam or weighing platform at their ends, the flexure plates being rigidly securable at their middle portions to hold such beam or platform against movement as a unit from a predetermined location.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. For use in a weighing apparatus: an elongate weigh rail having downwardly facing support surfaces at its ends and flexure plates on opposite sides of said weigh rail and secured at their ends to said weigh rail at locations adjacent its ends, said flexure plates being connectable to a support structure at midportions thereof to permit contraction and expansion of said weigh rail and downward deflection of said weigh rail when said weigh rail is supported by means engaging its support surfaces.

2. The device of claim 1 wherein said support surfaces and the longitudinal neutral axis of said weigh rail lie in a common plane.

3. The device of claim 2 wherein said flexure plates are secured to weigh rail at said common plane.

4. A weighing apparatus for weighing a load moving along the track rail having a longitudinal gap therein, said weighing apparatus including: a base extending below the gap in the track rail and beneath sections of the track rail extending in opposite directions from the gap; a support beam having lower portions thereof embedded in said base, said sections of the track rail extending in opposite directions from the gap extending over and being supported on said support beam; a support frame embedded in said base and including a pair of longitudinal support bars disposed on the opposite side of said support beam and spanning said gap; a weigh rail disposed in said gap in longitudinal alignment with said sections of the track rail and spaced therefrom; support saddles mounted on said support bars and extending below said weigh rail, said weigh rail having downwardly facing support surfaces at its ends slidably resting on said support saddles; longitudinal flexure plates on each side of said weigh rail secured to said weigh rail at locations adjacent its ends; and means mounted on said support bars connected to said flexure plates at the midportions thereof for holding said flexure plates against longitudinal and lateral movement for securing said flexure plates to said support bars, said flexure plates permitting expansion and contraction of said weigh rail and its downward deflection.

5. The weighing apparatus of claim 4 wherein said support surfaces and the longitudinal neutral axis of said weigh rail lie in a common horizontal plane, and wherein said flexure plates are secured to said weigh rail at said common plane.

6. The weighing apparatus of claim 5; and stop means rigid with said support beam for limiting movement of the track rail sections at opposite ends of the gap toward each other.

7. The weighing apparatus of claim 6, wherein said support saddles have arcuate top surfaces engaged by said support surfaces.

8. The weighing apparatus of claim 6 wherein said support saddles having planar top surfaces engaged by said support surfaces.

9. The weighing apparatus of claim 4; and stop means rigid with said support beam for limiting movement of the track rail sections at opposite ends of the gap toward each other.

10. A weighing apparatus for weighing a load moving along a pair of parallel track rails having longitudinal aligned gaps therein, said apparatus including: a base extending below the gaps in the track rails and beneath sections of the track rails extending in opposite directions from the gaps and secured to said base; a pair of parallel spaced support beams having lower portions thereof embedded in said base, said sections of said track rails extending in opposite directions from the gaps extending over and being supported on said support beams; a pair of support frames embedded in said base, each of said support frames including a pair of longitudinal support bars disposed on opposite sides of a support beam and spanning one of said gaps; weigh rails disposed in said gaps in longitudinal alignment with said sections of the track rails and spaced therefrom; a pair of support saddles mounted on said support bars of each of said support frames, said weigh rails having downwardly facing support surfaces at their ends slidably resting on said support saddles; flexure plates on each side of each of said weigh rails secured at the ends to said weigh rails at locations adjacent their ends; and means mounted on said support bars connected to said flexure plates at the midportions thereof for holding said flexure plates against longitudinal and lateral movement relative to said support bars while permitting contraction and expansion of said weigh rails and their downward deflection.

11. The weighing apparatus of claim 10 wherein said support surfaces and the neutral axis of each of said weigh rails lies in a common horizontal plane.

12. The weighing apparatus of claim 11; and stop means rigid with said support beams for limiting movement of the track rail sections at opposite ends of the gaps toward each other.

13. The weighing apparatus of claim 10; and stop means rigid with said support beams for limiting movement of the track rail sections at opposite ends of the gaps toward each other.

14. A weigh rail assembly including: a pair of longitudinally spaced support means providing transversely extending support surfaces; a weigh rail having downwardly facing support surfaces at its end portions resting on said support surfaces of said support means, said support surfaces and the longitudinal neutral axis of said weigh rail lying in a common horizontal plane; flexure plates on each side of said weigh rail secured to said weigh rail at locations adjacent its ends and at said common plane; and means rigidly securing said flexure plates at the midportions thereof for holding said flexure plates against longitudinal and lateral movement while permitting sliding movement of outer end portions of said weigh rail due to expansion and contraction thereof and also permitting downward deflection of said weigh rail between said support saddles.

No references cited.

RICHARD B. WILKINSON, *Primary Examiner.*

G. H. MILLER, Jr. *Examiner.*